Dec. 17, 1940.    G. E. POPE    2,224,924
FRICTION FACING AND METHOD OF MAKING SAME
Filed Nov. 16, 1935

Inventor:
George E. Pope
By: Lee J. Gary
Attorney

Patented Dec. 17, 1940

2,224,924

UNITED STATES PATENT OFFICE 2,224,924

FRICTION FACING AND METHOD OF MAKING SAME

George E. Pope, Bridgeport, Conn., assignor to Raybestos-Manhattan, Inc., Bridgeport, Conn., a corporation of New Jersey Application November 16, 1935, Serial No. 50,096

2 Claims. (Cl. 192—107)

This invention relates to friction elements for use in clutches or brakes, and more particularly the present invention is directed to an improved friction element having surface areas of different physical characteristics and method of making such friction elements of both the woven and unwoven type.

The present high state of development of mechanical devices, such as clutches and brakes of automobiles, has imposed exacting requirements on the character of frictional elements employed in these devices, and the types of frictional elements heretofore produced do not adequately meet all of the requirements of present-day devices of the above-mentioned character.

A generally well known process in the art of manufacturing friction elements of the unwoven type consists in depositing short asbestos fibers in a beater engine and mixing the fiber with water to form a pulp which is then delivered to what is known as a wet machine, and run off into sheets of asbestos fiber of a sufficient thickness. These sheets are then dried free of moisture and calendered to a predetermined thickness, and then they are cut into friction element blanks, either of annular form, segmental strips or rectangular strips. These blanks are then impregnated with a binder saturant for a predetermined period of time, and then they are subjected to heat treatment or a combination of heat treatment and pressure, so as to obtain certain physical and/or chemical characteristics of the binder which will produce a finished friction element adaptable for certain specific uses, such as automotive or industrial brakes or clutches.

It is likewise well known in the manufacture of woven friction elements that asbestos yarn, either metallic or non-metallic, may be employed and woven into a fabric of desired thickness and width. This woven element is then impregnated with a binder saturant for a predetermined interval of time, and then subjected to heat treatment for curing the binder.

Various binders or impregnating materials have been used in the manufacture of both the woven and unwoven types of friction elements. Some of such binders are as follows: drying oils, asphalts, phenolic resins, and combinations of these binders, such as drying oil-asphalt combinations, oil soluble resins, etc. It is well known that the use of certain binders impart to the finished friction element certain characteristics, some desirable and some undesirable. Some of the characteristics which determine the suitability of a friction element for certain usages are the following: the range of coefficient of friction, smoothness and softness of engagement, durability, abrasive action on brake drums or clutch plates, strength, hardness, and characteristics of the material which affect the manufacture of the elements or the properties which may effect the mechanical application of the elements to the brake shoes or clutch plates.

In order that a full appreciation may be had as to the importance of the present invention it is deemed advisable to point out that at the present time there is on the market a friction clutch facing that has proven commercially successful for use in certain installations. This friction element is treated with a binder of petroleum asphalt baked or cured to insolubility in organic solvents, producing a product having a relatively high proportion of petroleum coke content. It is recognized that this type of clutch facing has a comparatively high Brinell hardness, substantial strength, relatively high and uniform coefficient of friction, good durability, and is capable of being machined and drilled quite accurately. However, in certain clutch installations, the above-mentioned type of friction element is not sufficiently durable, and due to the abrasive nature of the frictional characteristics of the element, it will often cause warpage and abrasion or scoring of the clutch plates.

Another commercial type of friction clutch facing is produced by impregnating the asbestos friction element with a solution of synthetic resin, the resultant condensation product of a phenol or cresol with formaldehyde and a condensing agent, and then curing either by heat alone or a combination of heat and pressure. A clutch friction element produced by this method has a high Brinell hardness and great strength, and is relatively durable in service. However, this type of friction clutch facing is objectionable in some instances due to the fact that it sometimes possesses an objectionable characteristic recognized in the art as "drop-off" in frictional value with rise of temperature.

It is therefore a primary object of my invention to produce a friction element that possesses the desirable characteristics of the above referred to friction element, while eliminating certain undesirable characteristics.

Another object of this invention resides in selectively impregnating a plurality of different areas of a friction element with different binder saturants so as to obtain in a unitary friction element, a certain combination of desirable characteristics that are normally produced by the sole use of the respective binders.

A further object is to produce an improved friction element of the character mentioned which will compensate for "drop-off" of frictional value which usually results incident to temperature rise.

A still further object of my invention is to produce an improved friction element wherein a portion of its area is treated to produce a high frictional coefficient, and a different portion of its area is treated to produce substantially increased strength of material of said area.

And a still further object resides in the provision of an improved frictional element which is relatively strong, hard, highly durable and capable of accurate machining and finishing.

And still another object is to produce an improved product of the above-mentioned character which possesses a low rate of abrasive or scoring action on the co-operating clutch plate or brake drum.

In the drawing, Fig. 1 is a fragmentary perspective view of a portion of an annular frictional element, or what is known as a clutch facing.

Figure 1:
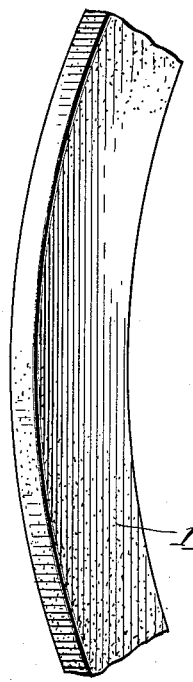
Figure 2:
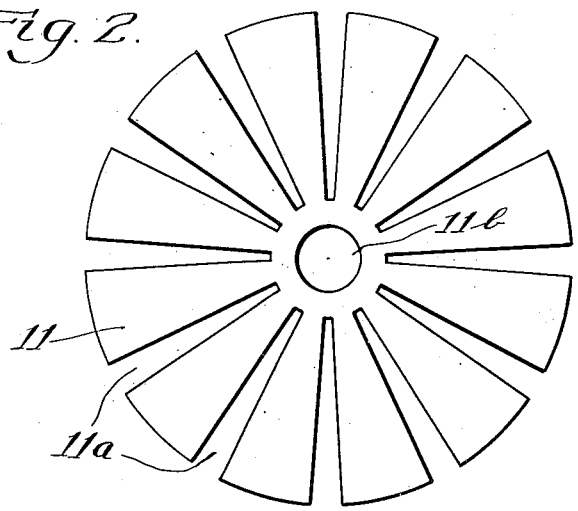
Fig. 2 is a plan view of an apertured mask of substantially disk form which is used to carry out the process embodying the present invention.
Figure 3:
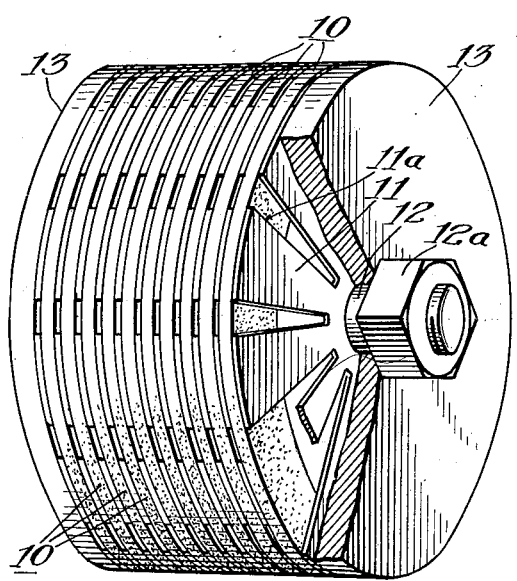
Fig. 3 is a perspective view of an assembly of annular-form friction elements and masking members of the type shown in Fig. 2, ready to be subjected to certain phases of treatment, embodying the present invention.

Referring now in detail to the drawing, numeral 10 designates friction elements of annular form adapted for use as clutch facings. In carrying out my novel method of treatment of these annular friction elements, I first assemble them in packs, with masking members interposed therebetween and at the respective ends of the pack. As may be seen in Figs. 2 and 3, the masking members which are indicated generally at 11, are of substantially disk form, and each of said members is provided with a plurality of radially disposed open slots 11$^a$, and a central aperture 11$^b$, through which passes a bolt or rod 12. It is to be understood that these mask members may be fabricated of any suitable material, such as metal, as long as it is impervious to liquid. It will be apparent that the masking elements may be of various shapes or designs so as to expose for treatment certain selected areas of the friction element, and it will be observed that in the use of the mask of the type shown in Fig. 2, there will be a series of spaced-apart segments of the annular friction element 10, which will be protected by the material intermediate the slots 11$^a$, of the mask member 11, during the process of treatment. When a desired number of elements and their masks are assembled, they are positioned between end plates 13, preferably of metal, and then the entire assembly is rigidly clamped together by means of a bolt or rod, 12, having a nut or nuts, 12$^a$.

The entire assembly is then immersed in a tank containing a binder saturant, and due to the use of the masks 11, only the exposed surface areas of the friction elements will become impregnated or saturated with the binder. In the assembly shown in Fig. 3, it will be observed that both the entire inner and outer annular edges, as well as the radially-spaced-apart segments of the flat faces of the annular friction element will be exposed for impregnation by the binder saturant.

A binder saturant that I have found suitable for my purpose consists of a solution composed of eighty parts of Mexican crude petroleum and twenty parts of gas oil, as set forth in United States Patent No. 1,710,094.

In carrying out my process, I have found it desirable to have the temperature of the binder saturant solution at approximately 300° F., and the packs or stacks of friction elements, in assembled relation, are permitted to remain in the binder solution until the exposed areas have become saturated to the desired extent. The time required will, of course, vary according to the area left exposed by the mask elements employed. I have found that in using a mask member of the design shown in Fig. 2, wherein approximately 25% of the area of the annular friction element is exposed, that this exposed area absorbed binder saturant so as to increase the total weight of the friction element about 28% over the original untreated weight. When the exposed surfaces of the friction element have become saturated to the desired extent, the assembly pack is then removed from the binder saturant and the excess binder solution is then allowed to drain off. This will require a period of time from one-half to two hours. The pack is then disassembled and the treated asbestos friction elements 10, are removed and hung up on rods for a short interval of time for drying at room temperature. These friction elements are then placed in ovens to cure the binder, and the following steps of heat treatment have been found entirely satisfactory: The elements are first subjected to a temperature range of 200° F. to 400° F., over a period of five to ten hours, and then the elements are subjected to final heat treatment of approximately 400° F., for a period of twelve to twenty-four hours, or for a period of time sufficiently long to insure insolubility of the binder in organic solvents, such as carbon tetrachloride. If desired, the length of the baking or curing operation may be determined by testing one of the friction elements by the above solvent.

The semi-treated friction elements are then spaced along rods about an eighth to a fourth of an inch apart and then they are immersed in a tank containing a binder or impregnating solution which is different from the binder solution of the first saturation. The binder to be employed at this time may, for example, consist of a cresylic acid hexamethylenetetramine combination, or what is known as cresol resin, but it will be manifest that various other equivalent binders may be used, such as, for example, drying oil, natural asphalt, synthetic resin-drying oil combinations, and others. The friction elements will be permitted to remain in this second binder saturant solution until they have become saturated to a desired extent. In this phase of treatment, the previously unexposed area of the friction element will now become impregnated solely with this second type of binder saturant, while the other, previously impregnated area of the friction element, will also be impregnated with the second binder saturant. In other words, by this method of treatment, there is produced a friction element in which a portion of its surface area is treated with one binder saturant, and another and different portion of its surface area is treated with two binder saturants, one different from the other.

After the friction elements have become sufficiently impregnated with the second binder saturant, they are then removed and permitted to air dry for a period of time, say six to twenty-four hours. Then these elements are assembled in a pack with plates 13, at opposite ends and clamped tightly together by a bolt 12. The pack of friction elements is then subjected to several stages of oven treatment for curing the second binder saturant. The schedule of heat treatment found satisfactory is as follows: Temperature of approximately 150° F. for a period of six hours; temperature of 175° F. for a period of six hours; temperature of 200° F. for a period of six hours, and a temperature of 225° F. for a period of twelve hours. The pack of friction elements is then disassembled and the elements are spaced apart on rods and subjected to the final curing treatment in an oven at 350° F. until the friction elements acquire sufficient strength and the desired Brinell hardness. The friction elements are then machined to finished dimensions, drilled, etc.

A friction element produced by this method may have different combinations of characteristics which render them particularly suitable for certain and different types of uses, and materially increases the length of desirable service of such elements. Friction elements may be produced by the above method so as to have a relatively low rate of abrasive or scoring action on clutch plates or brake shoes.

Another and important characteristic of the friction element which may be obtained by the above method, is that the selective treatment of different areas of the friction element by different binder saturants produces a finished product which will compensate for "drop-off" of frictional value due to temperature rise.

Another and important advantage may result by the use of my selective saturation process in that it is possible to employ a very strong binder saturant at some desired portion of the surface area of the element, so as to render said portion relatively strong, so as to adapt it for cooperation with splines or fingers which are formed as a rigid part of certain types of clutch housings, and which serves to position the friction element so as to permit axial movement, while preventing rotation thereof.

It is apparent that the above described process of treatment of friction elements is equally well suited for use with either the woven or unwoven type of asbestos friction elements, and the use of masking members may be employed in the manner above described, in both instances, obtaining a friction element having portions of its surface area treated in certain desired arrangement, or, combinations.

Although changes and modifications may be made in both the method and apparatus disclosed in connection with my invention, it is to be understood that the scope of this application is intended to cover such modifications as well as those specifically set forth above.

I claim as my invention:

1. A unitary friction element formed of substantially homogeneous fibrous material having two series of radial segments, one of said series of segments being impregnated with a binder for imparting a predetermined characteristic to the material of said series of segments, and both of said series of segments being impregnated with a different binder for imparting predetermined different characteristics to the material, of the respective series of segments.

2. A friction element of fibrous material having two contiguous series of radial segments, one of said series of segments being impregnated with a binder for imparting a predetermined characteristic to the material thereof, and both of said series of radial segments being impregnated with a different binder for imparting predetermined different characteristics to the material, of the respective series of radial segments.

GEORGE E. POPE.